United States Patent
Kröselberg et al.

(10) Patent No.: US 8,208,890 B2
(45) Date of Patent: Jun. 26, 2012

(54) METHOD FOR FORWARDING EMERGENCY MESSAGES FROM A TERMINAL IN A COMMUNICATION NETWORK

(75) Inventors: Dirk Kröselberg, München (DE); Richard Wisenöcker, Vienna (AT)

(73) Assignee: Siemens Aktiengesellschsft, Munich (DE)

( * ) Notice: Subject to any disclaimer, the term of this patent is extended or adjusted under 35 U.S.C. 154(b) by 428 days.

(21) Appl. No.: 12/310,391

(22) PCT Filed: Aug. 24, 2007

(86) PCT No.: PCT/EP2007/058827
§ 371 (c)(1), (2), (4) Date: Feb. 24, 2009

(87) PCT Pub. No.: WO2008/040597
PCT Pub. Date: Apr. 10, 2008

(65) Prior Publication Data
US 2009/0318109 A1    Dec. 24, 2009

(30) Foreign Application Priority Data
Aug. 24, 2006   (DE) .......................... 10 2006 039 790

(51) Int. Cl.
*H04M 11/04* (2006.01)
(52) U.S. Cl. .................. 455/404.1; 455/404.2; 455/405; 455/410; 455/411; 455/414.1; 379/37; 379/45; 379/51
(58) Field of Classification Search ............... 455/404.1, 455/404.2, 405, 410, 411, 414.1; 379/37, 379/45, 51
See application file for complete search history.

(56) References Cited

U.S. PATENT DOCUMENTS

| | | | |
|---|---|---|---|
| 6,477,362 B1 | 11/2002 | Raith et al. | |
| 2005/0003797 A1 | 1/2005 | Baldwin | |
| 2005/0197096 A1* | 9/2005 | Yang et al. | 455/404.1 |
| 2006/0030290 A1* | 2/2006 | Rudolf et al. | 455/404.1 |
| 2006/0153172 A1 | 7/2006 | Yamada et al. | |
| 2009/0129256 A1 | 5/2009 | Kato et al. | |
| 2009/0136006 A1* | 5/2009 | Milton et al. | 379/45 |
| 2009/0215424 A1* | 8/2009 | Petite | 455/404.1 |
| 2010/0303064 A1* | 12/2010 | Bari | 370/352 |

FOREIGN PATENT DOCUMENTS

| | | |
|---|---|---|
| CN | 1262017 | 8/2000 |
| DE | 202005009642 U1 | 11/2005 |
| JP | 2006-216994 | 8/2006 |
| JP | 2007-533277 | 11/2007 |
| JP | 2008-501260 | 1/2008 |
| JP | 2009-505455 | 2/2009 |
| KR | 1020030069155 A | 8/2003 |
| WO | 2005/112488 | 11/2005 |

(Continued)

OTHER PUBLICATIONS

Internet: www.WiMAXforum.org; Internet: www.WiMAXforum.org; Internet: www.WiMAXforum.org; Others, 2006.

(Continued)

*Primary Examiner* — Danh Le
*Assistant Examiner* — Khai M Nguyen
(74) *Attorney, Agent, or Firm* — Staas & Halsey LLP

(57) ABSTRACT

A method allows a user to transmit emergency messages to a selected communication network, in particular a WiMax network, even without valid registration.

9 Claims, 2 Drawing Sheets

FOREIGN PATENT DOCUMENTS

WO WO 2005109930 A2 11/2005
WO 2007/016695 2/2007

OTHER PUBLICATIONS

Chinese Office Action for related Chinese Patent Application No. 200780031443.5, issued on Apr. 13, 2011.
WiMAX End-to-End Network Systems Architecture (Stage 2: Architecture Tenets, Reference Model and Reference Points) [Part 2], WiMAX Forum Proprietary, 2006, 173 pages.
WiMAX End-to-End Network Systems Architecture (Stage 3: Detailed Protocols and Procedures), WiMAX Forum Proprietary, 2006, 271 pages.
Office Action issued by the Japanese Patent Office on Mar. 7, 2012 in the related Japanese patent application No. 2009-524206.
JP 2007-533277 corresponds to US 2009/0129256 and WO 2005/109930 (which was cited in the IDS filed on Feb. 24, 2009).
JP 2008-501260 corresponds to WO 2005/112488.
JP 2009-505455 corresponds to WO 2007/016695.
JP 2006-216994 corresponds to US 2006/0153172.

* cited by examiner

METHOD FOR FORWARDING EMERGENCY MESSAGES FROM A TERMINAL IN A COMMUNICATION NETWORK

CROSS REFERENCE TO RELATED APPLICATIONS

This application is based on and hereby claims priority to German Application No. 10 2006 039 790.8 filed on Aug. 24, 2006 and PCT Application No. PCT/EP2007/058827 filed on Aug. 24, 2007, the contents of which are hereby incorporated by reference.

BACKGROUND OF THE INVENTION

The invention relates to a method and a system for forwarding emergency messages in a communication network, especially for WiMAX networks.

In order to stimulate a new wireless communication technology for mobile terminals, which also achieves longer ranges of up to 30 km or more (line-of-sight) with high data throughput rates of 75 MB/s, a plurality of interested parties have joined together in the so-called WiMAX Forum (www.WiMAXforum.org). WiMAX (Worldwide Interoperability for Microwave Access) provides three frequency bands around 2.6 GHz, 3.5 GHz and 5.8 GHz with frequency bandwidths of 100 to 200 MHz. WiMAX supports Mobile-IP (Internet protocol) and thus enables mobile terminals to make telephone calls via Voice-over-IP with other communication users for example.

A requirement of future WiMAX networks is that, in addition to the existing services, they also support emergency services. The emergency services are intended to guarantee that a user is able, even without valid registration, to transmit emergency messages to the selected communication network.

No valid registration at the communication network exists unless the user possesses an appropriate key for authentication at the visited communication network. This is for example the case if the communication user has not registered with the respective network operator for the visited communication network or the network operator with which the communication user has negotiated a registration has no roaming agreement with the communication network now being visited.

A further possible reason for the absence of a valid registration at a communication network is when the prepaid account of the relevant communication user is empty or not sufficiently topped up.

Usually a terminal or its communication user are authenticated in accordance with the related art by an Authentication Authorization and Accounting Client (AAA Client) in the Access Serving Network (ASN) submitting a request message for authentication to the authentication server in the home network Connectivity Service Network (CSN). To this end a Network Access Identifier (NAI) is transferred in the authentication message of the terminal to the authentication server in the access network. The network access identifier features a character string for identification of the Network Service Provider (NSP), in which the relevant communication user has undertaken a registration. In addition the message usually contains a character string to identify the user. Based on the network access identifier and the information that it provides about the network service provider, the authentication server in the home network of the communication user will be found. In the event of a valid registration at a communication network not being available, access remains refused to the communication user. In such a case it is also not possible for the communication user to make emergency calls.

SUMMARY

One possible object is thus to make it possible for a communication user, in the event of a valid registration not being available to them, to still transmit emergency messages in a communication network.

The inventors propose a method for forwarding emergency messages from a terminal (MS) in a communication network with an access network (ASN), the emergency messages of the terminal are identified by a network access identifier (NAI). The access network (ASN) recognizes the emergency messages as such on the basis of the network access identifier (NAI) and forwards these to an emergency connectivity services network (emergency CSN). A significant difference thus relates to interpreting the emergency services as separate network service providers (NSP) and thus as self-contained connectivity services networks (CSN). This achieves the object of enabling emergency messages to be forwarded even without valid registration in the communication network from the access network (ASN) to an emergency services connectivity network. To this end for example, in accordance with the proposed method and devices, one or more routes are set up from access networks (ASN) to emergency connectivity services networks (emergency CSN).

An emergency connectivity services network (emergency CSN) is a logical unit, to which administrative tasks in particular are allocated. According to one embodiment, these tasks also include carrying out a successful authentication of terminals for which network access is not possible or has been refused and which wish to use an emergency service. In general an emergency CSN makes available one or more emergency services and guarantees the terminals use thereof. To this end the emergency CSN informs the ASN appropriately.

According to the related art a CSN currently already includes functionalities such as address allocation, especially of IP addresses, to terminals, quality-of-service-related functions, or an AAA functionality for authentication and authorization of users and for provision of user-related information to the access network (ASN).

In a further advantageous embodiment the terminal is not registered in the communication network. The authentication server (AAA) of the access network recognizes the emergency messages on the basis of the network access identifier (NAI) and registers the terminal with the communication network.

It should be pointed out simply as a precaution that an authentication server also includes an authentication client (AAA client) for the purposes of this discussion, as is usual from the protocol standpoint.

In an alternate embodiment of the method the terminal is not registered in the communication network. The access network (ASN) recognizes the emergency messages on the basis of the network access identifier (NAI) and forwards the emergency messages to the authentication server (AAA) of the emergency connectivity services network (emergency CSN). The authentication server (AAA) of the emergency connectivity services network (emergency CSN) registers the terminal in the communication network. In accordance with a preferred embodiment the network access identifier (NAI) is formed of a character string for identifying the terminal and a character string for addressing the emergency connectivity services network (emergency CSN).

In accordance with a further embodiment the terminal is not registered in the communication network. The access network (ASN) authenticates and/or authorizes the terminal based on device authentication.

In accordance with a preferred embodiment the authentication server (AAA) of the emergency connectivity services network (emergency CSN) accepts emergency messages which come from a previously authorized access network (ASN) and/or previously authorized authentication server (AAA) of a access network (ASN).

In accordance with a further advantageous embodiment a user profile is able to be predetermined by a communication network provider, on the basis of which parameters for a communication link between the terminal and the emergency connectivity services network (emergency CSN) will be defined. The network access identifier (NAI) contains further characters for identification of the predetermined user profile. The access network (ASN) and/or the emergency connectivity services network (emergency CSN) establish the predetermined user profile on the basis of the network access identifier (NAI). This has the advantageous effect that a class of communication user can be granted a QoS (quality-of-service) service for example, with which the required bandwidth for transmitting an emergency call by the Voice-over-IP service can be guaranteed.

The inventors also propose a system for forwarding emergency messages from a terminal in a communication network in which the emergency messages of the terminal are identified by a network access identifier (NAI). The system features an access network (ASN), which recognizes the emergency message as such on the basis of the network access identifier (NAI). The system also features an emergency connectivity services network (emergency CSN) to which the emergency messages are forwarded from the access network.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
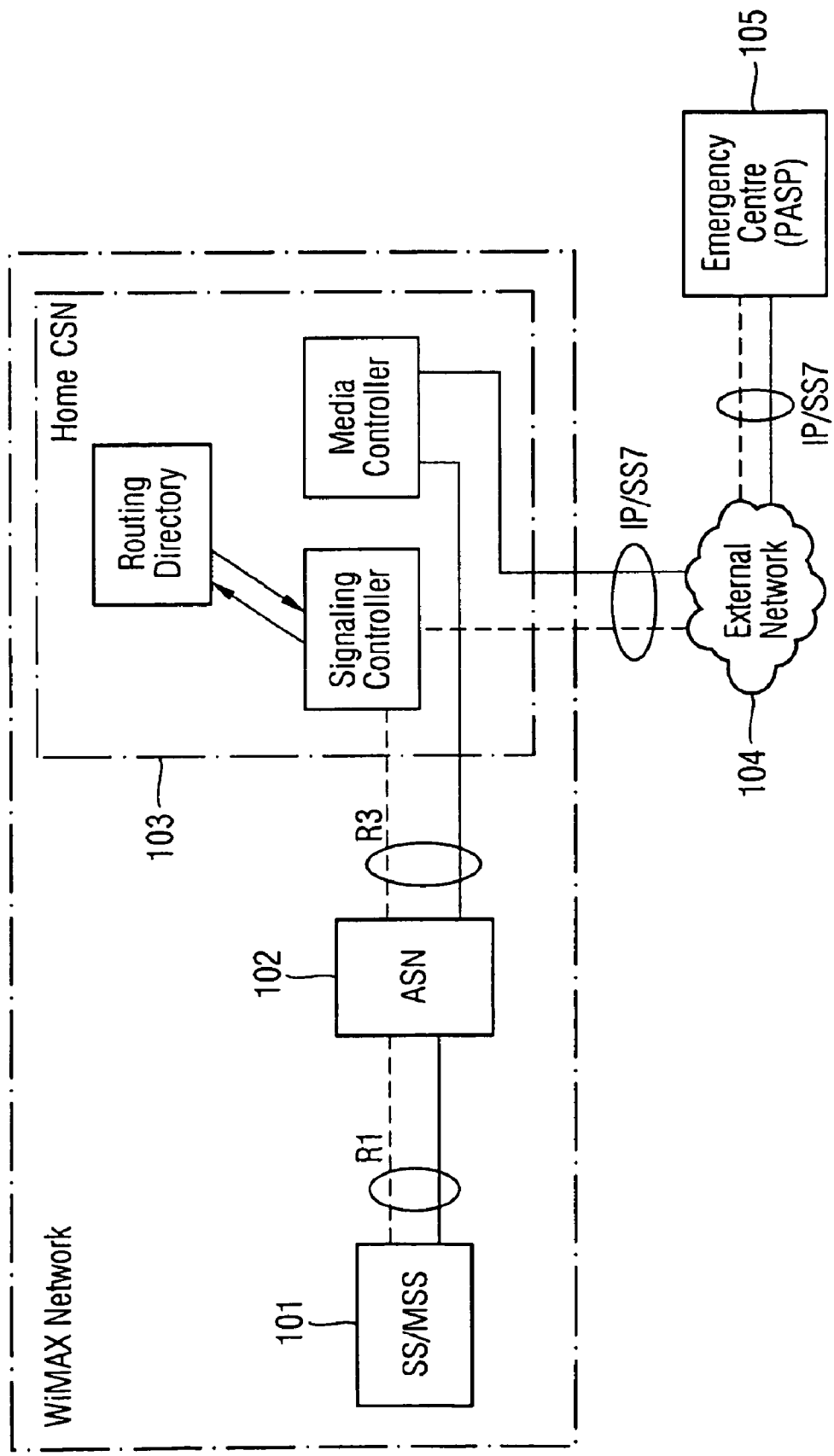
FIG. 1 a schematic diagram of a connection of an emergency service in a WiMAX-communication network according to the related art, FIG. 2 a schematic diagram of a proposed connection of an emergency service in a WiMAX communication network.

Reference will now be made in detail to the preferred embodiments of the present invention, examples of which are illustrated in the accompanying drawings, wherein like reference numerals refer to like elements throughout.

FIG. 1 shows a schematic diagram of a connection of an emergency service in a WiMAX communication network according to the related art. A mobile terminal 101 is connected via a connection point R1 to an access network (ASN) 102. The access network (ASN) 102 is in its turn connected via the connection point R3 to a home network (Home CSN) 103 of the mobile terminal 101. The home network (Home CSN) 103 now establishes a connection to an external communication network 104 outside the WiMAX communication network via the connection point IP/SS7, over which a connection is made to the emergency service 105. If the user of the mobile terminal 101 does not possess any valid authentication for the WiMAX communication network, according to the previously known method he would not even through the access network (ASN) 102, since he would have already been rejected by the access network (ASN) 102. In this case there would be no opportunity for the user of the mobile terminal 101 to make an emergency call to the emergency service 105.

In an existing solution incoming emergency calls would have to be recognized by a signalling controller and forwarded in accordance with an entry in the routing directory to the responsible emergency call center. With a different variant of the emergency call service in the WiMAX network and the emergency call center it can be necessary for the service to be adapted in order to allow successful communication. This task is generally handled by a media controller.

Figure 2:
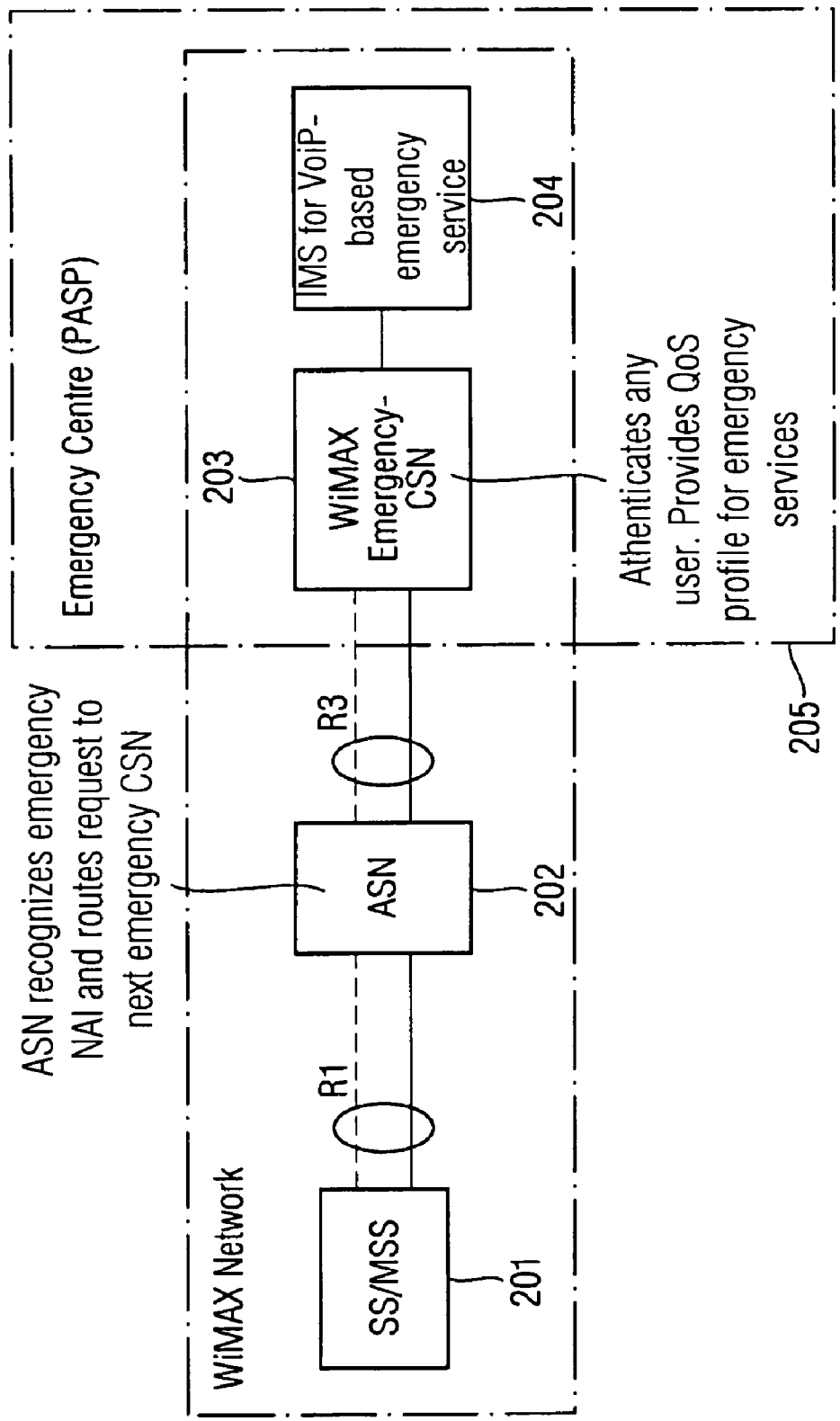

FIG. 2 shows a schematic diagram of a proposed connection of an emergency service in a WiMAX communication network. A mobile terminal 201 is connected via a connection point R3 to an access network (ASN) 202. The access network (ASN) 202 is again connected via a connection point R3 to an emergency connectivity services network (emergency CSN) 203, which once again has an IMS functionality 204 for Voice-over-IP-based emergency services. The emergency service 105 from FIG. 1 is thus interpreted as an independent network service provider for the WiMAX communication network and as a result has the necessary CSN functionality for the provision of emergency services.

The emergency CSN can then offer one or more emergency services which are part of the emergency CSN or are linked to this network. As an example an IMS (IP-based Multimedia Subsystem) can be contained within it or linked to it, which offers the option of a voice service (VoIP) to notify a person of the emergency.

In this exemplary embodiment the user of the mobile terminal 201 also does not have any valid authentication for the WiMAX communication network. If the user of the mobile terminal 201 transmits an emergency message to the access network (ASN) 202, the emergency messages are identified by a network access identifier, with the network access identifier (NAI) having characters with which the emergency messages can be identified as such.

In a possible embodiment variant for such a network access identifier (NAI) said identifier will be composed of the MAC address (Message Authentication Code) of the mobile terminal and a fixed character sequence for the domain part. This rigidly predetermined character sequence enables the access network (ASN) to recognize the emergency message. A possible character sequence for the domain part is for example "@emergency" or "@wimax.emergency.com". In a further possible embodiment of the network access identifier the domain part will be used in order for example to distinguish between different classes of emergency services. Such a possible domain part character sequence is for example "@110.emergency" or "@112.emergency".

For communication users with a valid authentication for the visited communication network, in accordance with an alternate embodiment of the network access identifier (NAI) a character sequence is provided, with reference to which the respective user and/or network service provider is able to be established. Such a network access identifier is for example "{emergency}username@hdomain.com" or "username@emergency.hdomain.com".

On the basis of the network access identifier (NAI) the access network (ASN) 202 recognizes the emergency messages and forwards the emergency messages to the next emergency connectivity services network (Emergency CSN) 203. The authentication server (AAA) of the emergency connectivity services network (Emergency CSN) 203 authenticates the user of the mobile terminal 201 on the basis of the network access identifier (NAI) and additionally determines on the basis of the network access identifier (NAI) a user profile of the relevant user for the required emergency service. The user profile in this exemplary embodiment provides a QoS services for this user, whereby the required bandwidth for a Voice-over-IP-based emergency service is provided by the emergency connectivity services network 204.

The proposed method thus guarantees that terminals can register even without valid registration in a WiMAX communication network, if an emergency service is accessed. In addition it can always be guaranteed that the necessary quality-of-service resources for use of an emergency service can be made available to a terminal, since this will be authorized directly by the emergency CSN and would not have to be authorized by a third party, such as a network operator for example.

An especial advantage of the proposed method is that only slight adaptations are necessary to a WiMAX communication network and especially to a WiMAX access network (ASN) in order to make emergency services available both to users without a valid network registration and also users with a valid network registration. The existing WiMAX functionalities guarantee that the data traffic of a user is always directed via a connectivity services network (CSN) and thus in this case always via the emergency connectivity services network (emergency CSN).

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for forwarding emergency messages from a terminal in a communication network with an access network, comprising:
    using a network access identifier to identify the emergency messages from the terminal;
    recognizing the emergency messages as such at the access network on the basis of the network access identifier; and
    forwarding the emergency messages from the access network to an emergency connectivity services network, wherein
    the network access identifier has a character string for identifying the terminal and a character string for addressing the emergency connectivity services network,
    the network access identifier includes characters for identification of a user profile,
    the access network and/or the emergency connectivity services network identify the user profile on the basis of the network access identifier, and
    the user profile is used to set parameters for a communication link between the terminal and the emergency connectivity services network.

2. The method as claimed in claim 1, wherein the communication network is a Worldwide Interoperability for Microwave Access (WiMAX) radio network.

3. The method as claimed in claim 1, wherein
    the terminal is not registered in the communication network, and
    an authentication server of the access network recognizes the emergency message on the basis of the network access identifier and registers the terminal in the communication network.

4. The method as claimed in claim 1, wherein
    the terminal is not registered in the communication network,
    the access network recognizes the emergency messages on the basis of the network access identifier and forwards the emergency messages to an authentication server of an emergency connectivity services network,
    the authentication server of the emergency connectivity services network registers the terminal in the communication network.

5. The method as claimed in claim 1, wherein
    the terminal is registered in the communication network, and
    the access network recognizes the emergency messages on the basis of the network access identifier and forwards the emergency messages to the emergency connectivity services network.

6. The method as claimed in claim 1, wherein
    the terminal is not registered in the communication network, and
    the access network authenticates and/or authorizes the terminal on the basis of a device authentication.

7. The method as claimed in claim 1, wherein
    the emergency connectivity services network and the access network both have an authentication server,
    the access network and/or the authentication server of the access network registers with the emergency connectivity services network, and
    the authentication server of the emergency connectivity services network accepts emergency messages if the access network and/or the authentication server of the access network is authorized.

8. A system for forwarding emergency messages from a terminal in a communication network, with the emergency messages of the terminal being identified by a network access identifier, comprising:
    an access network which recognizes the emergency messages as such on the basis of the network access identifier; and
    an emergency connectivity services network, to which recognized emergency messages are forwarded from the access network, wherein
    the network access identifier has a character string for identifying the terminal and a character string for addressing the emergency connectivity services network,
    the network access identifier includes characters for identification of a user profile,
    the access network and/or the emergency connectivity services network identify the user profile on the basis of the network access identifier, and
    the user profile is used to set parameters for a communication link between the terminal and the emergency connectivity services network.

9. A mobile terminal comprising:
    means for recognizing a message as an emergency message;
    means for identifying the emergency message as such with a network access identifier; and
    a transmitter to transmit the emergency message and the network access identifier to an emergency connectivity services through an access network, wherein
    the network access identifier has a character string for identifying the mobile terminal,
    the network access identifier includes characters for identification of a user profile,
    the access network and/or the emergency connectivity services network identify the user profile on the basis of the network access identifier, and
    the user profile is used to set parameters for a communication link between the terminal and the emergency connectivity services network.

* * * * *